Dec. 20, 1966   J. G. BLACK, JR., ET AL   3,292,233
METHOD OF ASSEMBLING LEADS TO WOUND CAPACITORS
Original Filed April 13, 1961
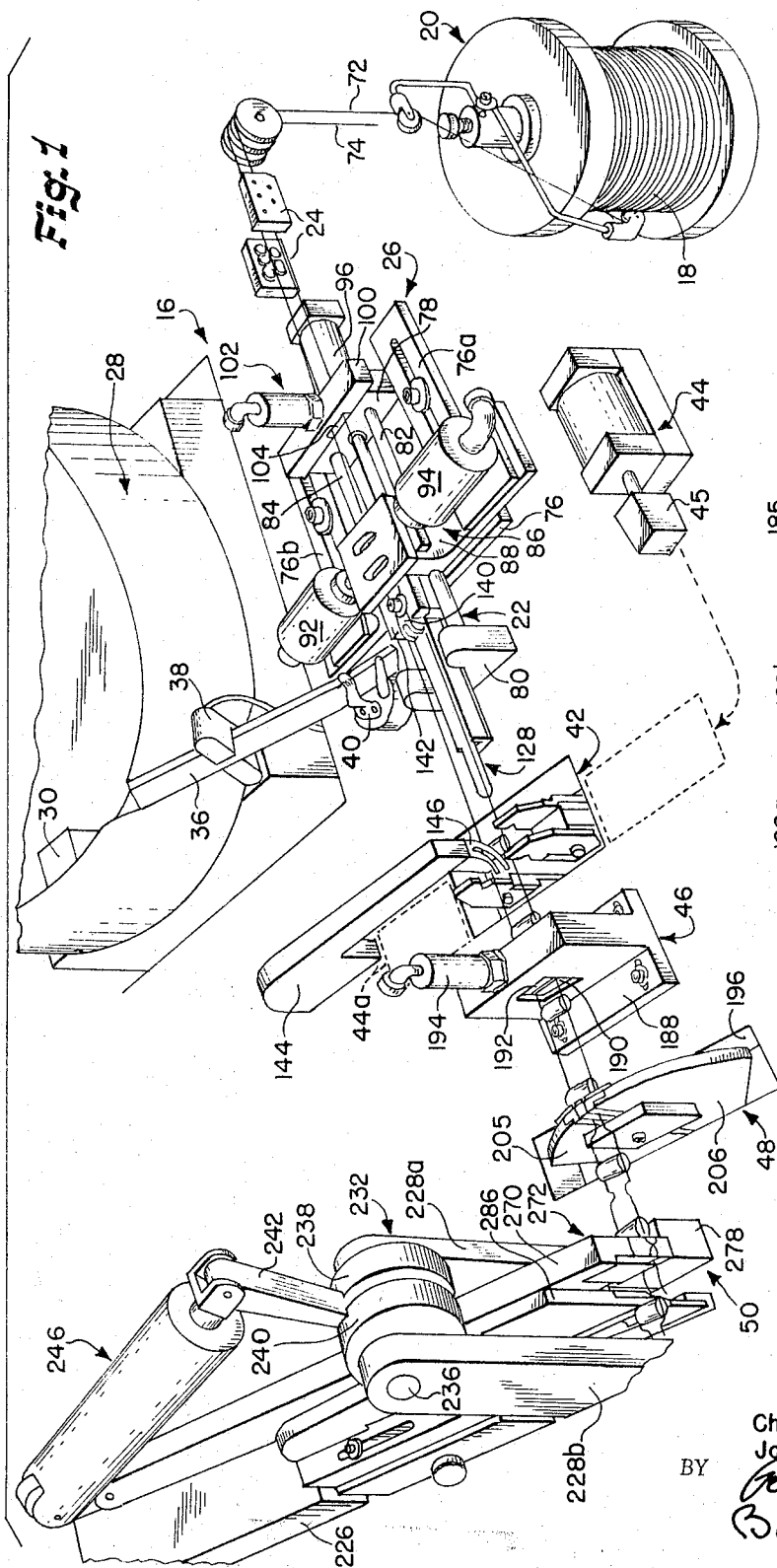
INVENTORS
Charles C. Rayburn
James G. Black, Jr.
BY Robert W. Beart
Barry L. Clark
His Att'ys

3,292,233
METHOD OF ASSEMBLING LEADS TO WOUND CAPACITORS
James G. Black, Jr., Springfield, and Charles C. Rayburn, Falls Church, Va., assignors to Illinois Tool Works Inc., Chicago, Ill., a corporation of Delaware
Original application Apr. 13, 1961, Ser. No. 102,753, now Patent No. 3,117,364, dated Jan. 14, 1964. Divided and this application Oct. 22, 1963, Ser. No. 317,946
2 Claims. (Cl. 29—25.42)

This application is a division of application Serial No. 102,753, filed April 13, 1961, which is now issued as U.S. Patent 3,117,364. U.S. Patent 3,117,364 is referred to for a detailed description of an apparatus for practicing the present invention and the disclosure of said patent is expressly incorporated herein.

This invention relates in general to a method for assembling electrical components and more particularly relates to a method for assembling lead wires to convolutely wound foil type capacitors.

In the copending application of Charles C. Rayburn, filed August 20, 1958, Serial No. 756,121, and assigned to the same assignee, now U.S. Patent No. 3,040,415, the inventor being one of the joint inventors of the instant application, there is disclosed a novel form of wound capacitor as well as the method of making same. This instant invention relates to a method for automatically making such a capacitor as well as certain other types of capacitors.

Wound capacitors are normally fabricated from strips or tapes of conductive material, such as a metal or a conductively coated dielectric, wound into a tight coil. In winding the capacitor coil or body, two or more conductive tapes are wound together with dielectric material positioned between the conductive tapes to insulate them from each other. In forming the conventional capacitor coil or blank, the conductive tapes are staggered so that the edge of one tape extends beyond one edge of the dielectric layer, while the opposite edge of the second tape extends beyond the second margin of the insulating layer. Thus, normally in winding the capacitor coil, two conductive tapes are wound in staggered arrangement with the intermediate dielectric material positioned only between the overlapping portions of the two conductive tapes. The wound capacitor coil thus has the opposed extending edges of the pair of conductive tapes forming the two ends of the coil. It is then common practice to secure a lead wire to each end of the coil formed by the conductive tapes by soldering.

Wound capacitors, using plastic or paper dielectric materials, are presently used in quantity by industry. However, such capacitor constructions have certain inherent disadvantages, especially if the conductive tapes are made of a thin tin foil. Such foil has little inherent mechanical strength. When the leads are soldered to the edges of such foil tapes, constant care must be exercised to prevent tearing away the leads from the capacitor. Attempts have been made to use aluminum foil in place of tin foil, and such presents the difficulty of soldering lead wires to aluminum. Still another form of capacitor of this construction uses conductive tapes formed from plastic sheet having a metalized coating on one side. Again, problems exist when an attempt is made to connect the lead wires to the edges of the metalized plastic tapes. Providing a good electrical contact between the lead wires and the metalized coating of the tape, and contemporaneously providing a sufficiently strong physical bond between the lead and the capacitor ends is difficult. In the already referred to Patent No. 3,040,415 of Rayburn there are disclosed wound capacitors which are fabricated from convolutely wound tapes of conductive foil and plastic dielectric tapes and from metalized or coated plastic tapes. In fabricating the first form in accordance with his invention, the foil tapes are separated from each other in overlapping position by a dielectric plastic tape which is wider than that used by others and extends beyond the edges of the foil. In attaching the leads to such a capacitor body, heat is applied to each of the leads to sufficiently high temperature so that when they are placed against opposite ends of the capacitor coil they will melt the extending edges of the plastic tape. The plastic of the tape will flow away and around the heated lead and permit it to be forced into an embedded position in the plastic foil and intimate contact with the edge of the metal foil tape in that area. Upon cooling, the melted plastic will normally fuse into a solid portion locking the lead within the edge of the capacitor coil and in contact with the edge of the metal foil. The same technique is applicable to a capacitor wound from metalized plastic tapes. In this type of capacitor, the heated lead wire will melt the plastic body of the metalized tape and accomplish the mounting of the lead into and onto each of the ends of the capacitor coil. The melted, then solidified plastic material fuses around each of the leads to lock the lead within the end of the capacitor coil. There is normally sufficient of the deposited metalized material within the fused portion of the plastic to provide good conductivity between the lead and the conductive strips of the capacitor.

The instant invention is well adapted to permit assembly in an automatic fashion of the following four types (a–d) of convolutely wound capacitor blanks, which untilize thermoplastic dielectric tapes: (a) the so-called *conventional extended foil type* of capacitor blank which utilizes tin or other low melting point metals as the electrode foils and wherein the foil extends beyond the side margins of the thermoplastic tapes which form the dielectric. These capacitor blanks are generally of the conventional non-inductive wound type. For certain applications, the leads may be tamped into place by special mechanism to be described to obtain the requisite bonding strength of the lead wires to the foil as well as to precisely dimension the size of the capacitor body in critical dimensional tolerance applications. While the length of the cylindrical capacitor blanks for this type of capacitor normally vary from one-quarter of an inch to one inch, depending on the application, the techniques and apparatus herein described may be used for almost any size of capacitor blank. The leads on the final capacitor, depending on the particular application, may be long and straight, short, short and crimped, crimped and swaged, or swaged. Some of the desired configurations of the final capacitor are shown in the copending applications of Charles C. Rayburn, filed on July 26, 1960, and having Serial Nos. 45,323, now Patent 3,056,939, and 45,421, now Patent 3,162,721. (b) and (c) The second and third types of capacitors adapted to be assembled by the instant apparatus are the aforediscussed *extended film* and *metalized film* capacitors shown in the aforementioned Rayburn Patent 3,040,415. The leads for these types of capacitors and the length or body styles are of the same general nature as those in the extended foil types in (a) above. (d) The fourth type of capacitor adapted to be handled by the instant apparatus and method is the so-called *"sheared ends"* type of capacitor blank. In this type of capacitor a low melting point type foil, such as tin, is cut flush with the ends of the plastic film and is also made in a variety of body and lead styles as previously discussed relative to (a) above. This type of capacitor is particularly used in miniature sizes.

The apparatus described herein will automatically assemble any of the type of capacitor blanks (a) through (d), discussed previously, to lead wires, preform and cut the lead wires to desired configuration and length, load the capacitors into mechanism for automatically applying a protective coating thereto and deliver the capacitors ready for packaging. The apparatus and method may be varied to suit the requirements of the particular capacitor end products desired.

Therefore, a general object of this invention is to provide a method for automatically securing terminal wires to a variety of types of rolled capacitor blanks in a continuous manner.

It is another object of this invention to automatically present wound capacitor blanks to a continuous supply of terminal wires and thereafter to physically and electrically join the blanks to terminal wires forming a continuous string or chain.

Another object of the invention is to bond the capacitor blanks and terminal wires together by selectively heating short portions of the terminal wires immediately adjacent to the capacitor blank by electrical means.

Still another object of the invention is to deform a continuous chain of assembled lead wires and capacitor blanks by moving portions of the lead wires intermediate the blanks towards each other so as to provide a desired formation or upset in the lead wires, which upsets facilitate their later assembly to a circuit board or the like.

A further object of the invention is to provide a method for swaging the capacitor leads to facilitate later assembly of the capacitor to a circuit board or the like.

Another object of the invention is to provide a method which will permit assembly of capacitors in a fast repetitive manner, which may be readily varied within wide ranges depending on the end product desired, and is otherwise well adapted for the purposes for which it is designed.

The novel features that are characteristic of the invention are set forth with particularity in the appended claims. An understanding of the invention, from a structural and functional standpoint, together with additional objects and advantages thereof, will be best understood by reading the following description in conjunction with the accompanying drawings, wherein:

FIGURE 1 is a perspective view, in semi-diagrammatic form, of an apparatus for performing the method of the present invention of automatically assembling capacitor workpieces to terminal wires, the flow of material through the apparatus being from right to left.

FIGURE 1A is a perspective view of a partial chain of capacitor blanks and terminal wires, the wires having been physically and electrically joined to the capacitor blanks and are an intermediate product of the apparatus;

FIGURE 2 is a semi-diagrammatic view showing the electrical circuit for heating portions of the lead wires adjacent to the ends of the capacitor coils for causing bonded engagement of the lead wires thereto;

FIGURE 3 is a semi-diagrammatic view of the apparatus which performs the cut-off and swaging operation on the terminal wires.

Referring to FIG. 1, the apparatus 16 shows a wire supply 18 in the form of a spool of wire. An identical second wire supply used with the apparatus is not shown. The wire may be of copper or steel cored copper of suitable gauge. Dereeling apparatus 20 of suitable form unwinds the wires 72 and 74 from the spools 20 through wire straightening devices 24 which relieves the torsional strain from the wire. Means 26 is provided for presenting the wires 72 and 74 in spaced arrangement at an assembly station 22, said means being in the form of wire orienting and wire moving means which intermittently moves the wires to the precisely desired locations relative to the other components.

Hopper means 28 contains a supply of capacitor bodies or workpieces 32 having an orienting band in the form of an electro-static shield 34. The shield 34 is located adjacent to one end of the body 32 (see FIG. 2). The blanks 32 are hopper fed through an orienting apparatus 30 and down a track means 36. The orienting apparatus 30 has detection means responsive to the electro-static shield 34 and orients the bodies in end to end position, the shield 34 being closer to the leading end of the individual bodies. Vibrator means 38 cause the capacitor foil-blanks 32 to move successively down the track 36 in end to end relationship. An escapement mechanism 40 near the end of the track 36 releases the capacitor blanks successively in oriented relationship to each other and delivers them to the assembly station 22 in intermittent timed relationship to movement of the wires 72–74 and the movement of components.

At assembly station 22 the wires 72 and 74 fed from the spool supplies are positioned to engage opposite ends of the oriented blank 32 fed from the hopper means. The terminal wires 72 and 74 together with the blank 32 are moved as a unit to the lead applying means 42 which permanently bonds the wires 72 and 74 to each of the blanks 32. Auxiliary lead tamping means 44 and 44a (the position of the latter being shown only in dotted lines) may be associated with the lead applying means 42 when it is desired to tamp the lead wires into the ends of the capacitors in the lead applying operation. Wire vise means 46 located to the left of the lead applying means 42 serves to fix the position of the components during the application of the leads to the capacitor bodies, as well as for subsequent operations.

With successive operations of the lead applying means 42, a chain of capacitors is formed on the pair of continuously fed terminal wires (see FIGURE 1A). Thereafter, the chain is passed through a crimping means 48 which deforms the terminal wires intermediate the spaced bonded capacitor blanks. After the crimping operation, the capacitor blanks and terminal wires in chain form, move to a swager and cut-off means 50 which may be set to simultaneously swage the terminal wires and cut the lead wires to provide discrete capacitor units.

A more detailed description of the major components and operations of the apparatus 16, the wire orienting and advancing means 26, will now be described. The two wires 72 and 74 as they leave their respective spools, passing through the wire straightening means 24, continue their movement from right to left as shown in FIGURE 1. The means 26 has a base 76 having a pair of horizontal leg portions 76a and 76b with mounting slots therein. The leg portions are adapted to be fixedly mounted on a suitable table or the like. A pair of spaced vertical upright end portions 78 and 80 are fixed relative to the base 76 and mount a pair of spaced horizontal slide rods 82 and 84. A carriage means 86 is mounted for sliding movement on the rods 82 and 84.

The upright portion 78 has associated therewith jaw block means 100 capable of up-down movement for sequentially engaging opposed sides of the wires 72–74. The jaw block means 100 is intermittently actuated by an air cylinder 102 in timed relationship to the movement of the other components. The up-down jaw block means 100 includes an insert 104 which is actuated by air cylinder 102 in a generally vertical plane. Member 104 together with the top surface of up-right 78 form a pair of clamping jaws for stabilizing the position of wires 72 and 74 which are disposed therebetween. Jaw block means 100 is in effect, a releasable wire vise.

The carriage means 86 comprises a carriage base 88 having a movable jaw block means (not shown) associated therewith. The movable jaw block means has a left actuator 92 and a right actuator 94 which are mounted on the carriage base. The actuators 92 and 94 are air cylinders and intermittently actuate the jaw block assembly into engagement with wires 72–74 in timed relationship to the movement of the other components to be described.

The movable jaw block assembly mounted on carriage base 88 forms another wire vise.

The lead applying means 42 for causing bonding engagement of the wires 72 and 74 to the ends of the capacitor bodies 32 comprises movable jaw means projecting through an apertured table and an overhead support member 144. Mounted on member 144 is a dependable orienting flexible leaf spring member 146 which serves as a resilient stop for the capacitor workpiece blank to assure correct initial orientation of the blank between the four part head of the lead applying means 42. The overhead arm 144 may be suitably mounted on the worktable as desired. The tampering means 44 (which is not needed on the assembly of all forms of capacitors) is used to force the leads into the ends of the capacitor and to shorten the capacitor when neded.

The worktable may be apertured so that only the four head portions of means 42 projects therethrough on opposite sides of the path of the two wires 72 and 74. The head portions include heads 168a–b and 170a–b which are preferably formed of copper with each having a V-shaped groove therein which engages the wires 72 and 74 on opposite sides of the workpiece blank 32 as shown diagrammatically in FIGURE 2. As the heads are brought into contact with the wires a switch 184 is actuated. The switch 184, in a circuit with an electrical source, when actuated causes a current to pass (in series arrangement) through blades on the four heads and through the terminal wires as shown semi-diagrammatically by the arrows in FIGURE 2. To complete the electrical circuit from the source of high amperage electricity between the members 168a and 170a, and between 168b and 170b, heavy "battery strap" type cables 188a–b are attached to each of the members at the bottoms thereof. The circuit is thus from the source of electricity, a variable tap transformer 185, through electronic timer means 183, through switch 184, through cable 188a, through a blade on head 170b, through a short stretch of wire 72, through a blade on head 170a, through cable 188b, through a blade on head 168a, thence through wire 74, through a blade on head 168b, and finally through cable 188a back to the source. The small cross sectional area of wires 72 and 74 relative to the cross sectional area of the rest of the circuit, causes wires 72 and 74 to be resistance elements and causes them to become heated rapidly.

During the heating operation, a strong biasing force is applied to members 168a and 170a and 168b and 170b in a generally inwardly direction forcing the heated portions of wires into the end surfaces of the capacitor blank or body 32. The duration of the current is short so that the plastic material which is heated to its melting point will quickly cool and fuse around the wires as will be discussed.

Immediately to the left of the lead applying means 42 (FIG. 1) is the wire vise means 46 which is similar in function to the up-down wire vise means 100 except that it must have sufficient movement to accommodate the capacitor foils and lead wires in assembled relation. The wire vise means 46 comprises a base portion 188 which is fixedly mounted relative to a worktable or the like having a rather large central aperture 190. Movable jaw means 192 is actuated by air cylinder means 194. The air cylinder is actuated in timed relationship to the movement of the other components of the apparatus. Movable jaw member 192 has sufficient movement to allow the capacitor bodies to easily pass between it and the fixed jaw member. As shown in FIGURE 1, the movable member 192 is adapted to impinge upon the wires 72–74 intermediate the mounted capacitor bodies and firmly holds the chain of capacitors in fixed position for the operation of the immediately preceding station where the lead applying means 42 is operative and also for the next succeeding operation of crimping the lead wires.

Immediately to the left of wire vise means 46 (FIGURE 1) is the crimping means 48 which is conveniently mounted on the underside of the worktable and projecting through an aperture 196 in the worktable into the path of the chain of assembled capacitor bodies and wires. This crimping operation is accomplished in timed relation to other operations. The crimping mechanism 48 includes a pair of pivoted head members 205, 206 which are actuated by an air cylinder (not shown) to crimp the wires 72, 74 into a shape such as that shown to the left of the crimping means 48 in FIG. 1.

Although not shown, intermediate guide means may be interposed between the lead applying means 42 and the wire vise means 46; between the wire vise means 46 and the crimping means 48; and between the crimping means 48 and the swaging and cut-off means 50. Such guide means would provide restraint against deviations in the horizontal and vertical positions of the chain of capacitor bodies and wires during movements between the various stations.

The swager-cutoff means 50 is located immediately to the left (or down stream in terms of flow of movement of the materials) of the crimping mechanism 48. The essential function of the swaging cutoff mechanism is to receive the chain of assembled capacitor bodies and wires from the crimping mechanism and to simultaneously swage to a desired configuration and then cut off the lead wires to desired length.

The swager-cutoff mechanism 50 comprises a base 226 mounting a pair of upstanding vertical arms 228a, 228b in generally opposed relation on opposite sides thereof. Near the tops of the arms 228a–228b an eccentric mechanism 232 is mounted on pivot shaft 236. The eccentric has two offset cam surfaces 238 and 240 and an up-standing vertical lug 242 which connects the eccentric to an air cylinder 246. Selective actuation of the air cylinder 246 causes eccentric 232 to rotate about the axis of shaft 236, moving cam surfaces 238 and 240. The movement of the eccentric 232 simultaneously moves pivoted arms 270 and 286 in timed relationship.

Mounted on the free end of arm 270 is a head mechanism 272 comprising swaging head 274 and cutter member 276 which simultaneously swages and cuts both of the wires 72 and 74. The swaging head 274 and cutter member 276 are co-actable with fixed block 278 as shown in FIG. 3. Block 278 is adjustably fixed to the base 226 and has a top swaging surface of preselected configuration for co-action with the head 274. The black 278 also has a shear surface 280 for co-action with the cutter portion 276. Arm 286 carries a cutter blade 296 which cooperates with fixed cutter 298 (FIG. 3) to cut the wires 72, 74 adjacent the capacitor body. Following the swaging and cutoff operation performed by means 50, the cut-off capacitor can be transferred by mechanism (not shown) to other stations for the performance of additional operations such as coating, if desired. Alternatively, the capacitor can be dropped onto a receiving means (not shown).

It is sometimes desirable to have precise length dimensions of critical values of the body in the final capacitor product. Since the winding mechanisms presently commercially utilized for winding capacitor foil blanks seldom give a perfectly dimensioned product (due to variation in width of winding strips, stray or weave of the winding strips during the winding operation, etc.) means to precisely dimension the length of the capacitor body for certain applications becomes an important aspect of the machine. In manufacture of capacitors of the metallized film type, it is often desirable to tamp the ends of the capacitor body to insure good electrical contact and firm bonding of the fused thermoplastic material with the lead wires. The tamping means 44 will accomplish these results. It has tamping extensions 45 adapted when actuated to positively engage the ends of the capacitors during the operation of the lead applying means 42 and form heated plastic material into a compact unit of desired length. The extensions 45 are made of a high temperature insulating material (such as is sold under the trade mark "Teflon") and actuated by the air cylinder portion 44 simultaneously with the heads 168a–b and 170a–b of the lead applying means 42 and in timed relationship to movement of all the other components.

Operation

The operation of the apparatus 16 is essentially as follows: Wires 72 and 74 are de-reeled from the supply reels 20 as it is pulled by the wire orienting and wire moving means 26. The up-down jaw block means 100 is in clamping relationship to the wires. The carriage means 86 is located in the position as viewed in FIGURE 1. An oriented capacitor blank is escaped from the track 36 by the escapement 40 into the assembly station 22. The adjustable platform 128 carries the capacitor blank at its proper height (size dependent) for orientation relative to the wires. Jaw block means 100 now releases the wires 72–74 and the movable jaw block assembly comprising left and right actuators 92–94 is actuated to place two pairs of jaws in firm clamping engagement to the wires. This causes the wires to clampingly engage the ends of the capacitor blank 32. The push-pull actuator 96 moves the entire carriage means 86 forward (to the left as viewed in FIGURE 1). The movement of the carriage means 86 causes fingers of the pusher orienting spring 140 to engage the capacitor blank to assure orientation thereof and to move the capacitor blank and wires simultaneously. The actuator 96 stops the carriage means 86 when the capacitor reaches a center position relative to the lead applying means 42. This movement of the carriage means causes movement of the wires from the supply means. The capacitor slides along the platform and the depending fingers 146 of means 42 help to correctly align the capacitor in its position.

It will be realized that the capacitor is escaped onto the adjustable platform prior to movement of the carriage means 86 and prior to the actuation of the left and right actuators 92 and 94, the movement of the actuators causing movement of the wires into a clamping engagement with the capacitor blank so that the wires and the capacitor blank move as a unit to the station between the heads of the lead applying means 42 upon movement of the push-pull cylinder 96. It is not absolutely necessary to clamp the wires to the capacitor ends since fingers 142 of member 140 will move the capacitor blank into position at the lead applying means.

When the capacitor is correctly aligned in the lead applying means, air cylinders (not shown) connected thereto are actuated to cause the jaw vises associated therewith to firmly clamp the wires into fixed position. The push-pull actuator 96 then moves the carriage means 86 back to the initial position upon the release of the wires 72 and 74 by the movable jaw block means. Meanwhile, the lead applying head of means 42 closes to contact each wire 72 and 74 on each side of the capacitor blank. The contact portions on the head 168a–b and 170a–b of the lead applying means 42 (FIG. 2) are automatically connected to a power source in a series of arrangement which affords the same current flow through both wires for the same duration. The amount of current is controlled by a suitable transformer tap adjustment 185 and applied for a duration as set on a precision electric timer 183. This causes the wires to heat up and melt into the thermoplastic portions of the capacitor foils. Since the application of the current is for a short duration, the wires cool and the melted thermoplastic from the dielectric films fuses around the wires.

An alternate to the use of a precision timer 183 to provide the exact desired duration of electric power application to means 42, is the use of a voltage sensitive control means (not shown). A voltage sensitive control means allows the current to flow as the potential across the lead applying contacts 168a and 170a is increasing, but opens the circuit automatically as the potential thereacross is noted to decrease. This decrease is produced when the wires 72 and 74 contact another material other than the one they are melting through and the additional heat required by the new material extracts heat from the portions of wires 72 and 74 being heated, which lowers the wire temperature and consequently lowers the electrical resistance. Since the wires 72–74 are mainly formed of copper and copper has a positive temperature coefficient of resistance, the noted drop in potential, by Ohm's law is reflective of the fact that in this particular environment a new material has been contacted. This alternate method utilizing a potential change as noted by the voltage sensing device provides optimum wire placement since it is work dependent rather than time dependent.

The tamping sealing means 44 may be actuated simultaneously with the movement of the heads of the lead applying means 42. The head portions 45 press on opposite sides of the capacitor to reduce the length of the capacitor particularly in the extended foil types of capacitor blanks or where critical size relationships are needed. In the case of metallized foil types of capacitor blanks, the end of the insulating blocks 45 are preferably formed with a hole in the center which causes the sealing of the thermosplatic materials over the wires 72 and 74 on the edges of the capacitor foil, but leaves the wire uncovered in an area near the center of the capacitor and which allows the wire to be contacted directly by a metallic spray. (The spray connects all turns of the metallized extension and connects it to the wire leads. The wire lead gains mechanical strength and is bonded to the capacitor through bonding to the plastic and from mechanical holding of the sprayed metallized materials and coating.) The pushers or tampers 44 are also useful in forcing the wire to a control depth into the so-called shear end type of capacitor blanks while sealing the thermoplastic portions over the wires 72 and 74.

The holding means or wire vise means 46 and 100 locks the wires in fixed position during the lead applying operation. The vise means 46, as the lead applying heads 168a–b and 170a–b and the tamping means 44 exert a force on the wires 72–74, preventing the already mounted capacitors from being withdrawn from their indexed position.

In this manner a continuous chain 68 of capacitors and lead wires are formed. The intermediate product is shown in FIGURE 1A and has a somewhat ladder like shape. The operation is continuous and the movements of the various parts are synchronized with each other.

The chain of capacitors 68 are then moved to the crimping mechanism 48 which lowers and rises in synchronization with the capacitor indexing and actuates to perform the desired crimping aforediscussed. A variety of tooling may be provided to the crimping head to give a variety of crimp styles.

After crimping, the cutter swager mechanism 50 simultaneously cuts the chain 68 in two preselected preset positions and swages the leads to desired configurations as provided by the adjustable tooling in the heads of the mechanism. The capacitor unit is then moved by a transfer mechanism (not shown) for the performance of further operations or tests, or alternatively, it is dropped from the cutter swager to a conveyor mechanism not shown.

While the specific embodiments of the invention have been shown and described, it is with full awareness that many modifications thereof are possible. The invention, therefore, is not to be restricted except insofar as is necessary by the prior art and by the spirit of the appended claims.

What is claimed as the invention is:

1. The method of automatically assembling leads to wound capacitor blanks including the steps of dereeling wires and presenting the wires in spaced substantially parallel relation at an assembly station, placing between the spaced wires at said assembly station a capacitor blank of convolutely wound alternate layers of thermoplastic films and electrode foils in which the edges of said thermoplastic films extend beyond the edges of said electrode foils and constitute the ends of said capacitor blank, bringing current carrying electrodes into contact with each of said wires at points on each side of said capacitor blank and closely adjacent thereto, simultaneously passing electrical current through the portions of said wires between said points on each of said wires to heat said portions while laterally moving the heated portions toward each other, melting the thermoplastic ends of said capacitor blank with said heated wire portions, applying a force to each end of said capacitor blank to reduce the axial length of said blank while simultaneously embedding the wires in physical and electrical contact with a plurality of electrode foils within said capacitor blank, and severing the wires at points spaced away from the capacitor blank thereby forming a completed and discrete capacitor unit.

2. The method set forth in claim 1 including the step of deforming the spaced wires prior to severing same.

References Cited by the Examiner
UNITED STATES PATENTS

| | | | |
|---|---|---|---|
| 2,455,136 | 11/1948 | Obert | 317—260 X |
| 2,785,352 | 3/1957 | Netherwood | 317—260 |
| 3,040,415 | 6/1962 | Rayburn | 29—25.42 |
| 3,145,448 | 8/1964 | Cotton | 29—25.42 |
| 3,221,386 | 12/1965 | Demarest | 29—25.11 |

JOHN F. CAMPBELL, *Primary Examiner.*

WHITMORE A. WILTZ, *Examiner.*

W. I. BROOKS, *Assistant Examiner.*